(12) United States Patent
Israel

(10) Patent No.: US 9,055,061 B2
(45) Date of Patent: Jun. 9, 2015

(54) PROCESS OF AUTHENTICATION FOR AN ACCESS TO A WEB SITE

(71) Applicant: LoginPeople SA, Valbonne (FR)

(72) Inventor: Maurice Israel, Ecos (FR)

(73) Assignee: LoginPeople SA, Valbonne (FR)

( * ) Notice: Subject to any disclaimer, the term of this patent is extended or adjusted under 35 U.S.C. 154(b) by 155 days.

(21) Appl. No.: 13/790,754

(22) Filed: Mar. 8, 2013

(65) Prior Publication Data

US 2014/0109201 A1     Apr. 17, 2014

Related U.S. Application Data

(63) Continuation of application No. PCT/EP2011/004514, filed on Sep. 8, 2011.

(30) Foreign Application Priority Data

Sep. 9, 2010 (FR) ..................................... 10 03601

(51) Int. Cl.
*H04L 29/06* (2006.01)
*G06F 21/31* (2013.01)
(Continued)

(52) U.S. Cl.
CPC ............ *H04L 63/0884* (2013.01); *G06F 21/31* (2013.01); *G06F 21/34* (2013.01); *G06F 21/6218* (2013.01); *G06F 2221/2103* (2013.01); *G06F 2221/2115* (2013.01);
(Continued)

(58) Field of Classification Search
CPC . G06F 21/31; G06F 21/6218; G06F 21/6272; G06F 2221/2141; G06F 2221/2103; G06F 2221/2115; G06F 2221/2129; G06F 2221/2151; H04L 63/0838; H04L 63/168; H04L 63/102; H04L 63/0876; H04L 63/067; H04L 63/205; H04L 9/321; H04L 9/3228; H04L 9/3271; H04L 9/32; H04L 9/3276; H04L 69/24

USPC ........................................................... 726/5
See application file for complete search history.

(56) References Cited

U.S. PATENT DOCUMENTS 5,802,365 A * 9/1998 Kathail et al. ................. 719/321
6,151,643 A * 11/2000 Cheng et al. .................... 710/36
(Continued)

FOREIGN PATENT DOCUMENTS

WO    WO 2012/031755    3/2012

OTHER PUBLICATIONS

Nystrom, M., et al, 'UEFI networking and pre-OS security', Intel Technology Journal, vol. 15, Issue 1, 2011, entire document, http://www.researchgate.net/profile/Vincent_Zimmer/publication/235258577_UEFI_Networking_and_Pre-OS_Security/links/0fcfd510b3ff7138f4000000.pdf.*

(Continued)

*Primary Examiner* — Luu Pham
*Assistant Examiner* — Ronald Baum
(74) *Attorney, Agent, or Firm* — Saile Ackerman LLC; Stephen B. Ackerman

(57) ABSTRACT

A Process of reinforced authentication based on data collection of hardware components contained in a system having steps of enrolment authentication. A web site is connected to and a web page received. A list of hardware components is detected and collected. A subset of the list constituting digital information of reference (DDNA) is generated by a hash operation applied to the raw data. The DDNA is used with a received seed of an authentication server to generate a unique use password (OTP).

2 Claims, 2 Drawing Sheets

(51) Int. Cl.
  *G06F 21/34* (2013.01)
  *G06F 21/62* (2013.01)
  *H04L 9/32* (2006.01)

(52) U.S. Cl.
  CPC ............... *G06F 2221/2129* (2013.01); *G06F 2221/2151* (2013.01); *H04L 9/321* (2013.01); *H04L 9/3228* (2013.01); *H04L 9/3271* (2013.01); *H04L 63/0838* (2013.01); *H04L 63/0876* (2013.01)

(56) References Cited

U.S. PATENT DOCUMENTS

| | | | |
|---|---|---|---|
| 6,161,151 A * | 12/2000 | Sudhakaran et al. | 710/10 |
| 6,230,199 B1 * | 5/2001 | Revashetti et al. | 709/224 |
| 6,463,537 B1 * | 10/2002 | Tello | 713/182 |
| 6,513,159 B1 * | 1/2003 | Dodson | 717/178 |
| 6,678,731 B1 | 1/2004 | Howard et al. | |
| 6,826,686 B1 | 11/2004 | Peyravian et al. | |
| 6,880,086 B2 * | 4/2005 | Kidder et al. | 713/191 |
| 7,073,059 B2 * | 7/2006 | Worely et al. | 713/168 |
| 7,143,153 B1 * | 11/2006 | Black et al. | 709/223 |
| 7,328,453 B2 * | 2/2008 | Merkle et al. | 726/23 |
| 7,480,740 B1 * | 1/2009 | Saxena et al. | 710/8 |
| 7,877,614 B2 | 1/2011 | Frenkiel et al. | |
| 8,117,461 B2 * | 2/2012 | Bigelow et al. | 713/187 |
| 8,655,785 B2 * | 2/2014 | Zunke | 705/59 |
| 2002/0026576 A1 | 2/2002 | Das-Purkayastha et al. | |
| 2003/0041088 A1 * | 2/2003 | Wilson et al. | 709/104 |
| 2003/0159070 A1 * | 8/2003 | Mayer et al. | 713/201 |
| 2004/0003266 A1 * | 1/2004 | Moshir et al. | 713/191 |
| 2007/0136814 A1 * | 6/2007 | Lee et al. | 726/25 |
| 2007/0186103 A1 | 8/2007 | Randle et al. | |
| 2008/0104705 A1 * | 5/2008 | Hasbun | 726/26 |
| 2009/0193511 A1 * | 7/2009 | Noe et al. | 726/9 |
| 2009/0222907 A1 * | 9/2009 | Guichard | 726/17 |
| 2010/0100610 A1 * | 4/2010 | Bezanson et al. | 709/220 |
| 2010/0180328 A1 * | 7/2010 | Moas et al. | 726/6 |

OTHER PUBLICATIONS

HP Development Co., L.P., 'HP ProLiant DL580 Gen8 Server technology', Jun. 2014, HP Development Co., L.P., entire document, http://h20195.www2.hp.com/v2/GetPDF.aspx%2F4AA5-1116ENW.pdf.*

Written Opinion of the Int'l Searching Authority PCT/EP2011/004514 Mail Date—Mar. 22, 2012.

"Public-key cryptography and password protocols," by Shai Halevi et al., XP-000986777, IBM T. J. Watson Research Center, NY, pp. 122-131, Nov. 1998.

* cited by examiner

PROCESS OF AUTHENTICATION FOR AN ACCESS TO A WEB SITE

This application is a continuation of International Application No. PCT/EP2011/004514, filed on Sep. 8, 2011, and herein incorporated by reference in its entirety

TECHNICAL FIELD

The present invention relates to digital telecommunications (internet) and more particularly to a process of authentication for the access to a web site on the internet network or on an intranet network.

BACKGROUND ART

The internet network gave rise to a spectacular development of digital exchanges in the whole world through online applications on web sites. A digital identity (including an identifier known as "login" and a password) allows the access of a user to an application on said web site. As it is known, the pirates and frauds developed tools and techniques to usurp such digital identities, particularly the "horses of Troy", the "spy" softwares, "keyloggers" and network sniffers such as the "Man in the Middle". Thanks to such techniques, the identifier and the password of any user being regularly registered by a web site might be captured and used for a abusive logging without the knowledge of the user. The detection of such a fraud is proved to be difficult because of the fact that the digital data can be modified almost without leaving traces. Moreover, the attack can be carried instantaneously from a computer being in a distance of thousands of kilometers, rendering any protection particularly difficult, in particular on the legal level.

The multiplication of the usurpations of digital identities shows nowadays to be a major threat for the digital economy in general and the online trade in particular.

This results to a source of significant insecurity.

Techniques for improving the security of control access of digital applications are already known. Indicated under the name "strong authentication", they add to the control what the authorized user knows (his password), what he owns (a hardware element) or what he is (its biometric data such as for example its digital fingerprints).

A first technique designated as "One Time Password" consists in providing each legitimate user with an electronic device able to generate a random number being used as a password at the time of his connection to the online application. Thus, the interception or the capture of the password will not allow the access to the application in question, because this password will not be valid any more since it will have been already used and thus will have been valid only once, from which it comes the denomination One Time Password.

Another known technique under the name of "outside band" consists in the transmission of a message through another communication channel, for example an SMS on the mobile phone of the user when the latter wishes to be connected to its information system or to the web site in question. The authentication procedure succeeds only when the web server receives communication of the code dispatched to the user through the other transportation route. This results in that a hacker who might have successfully intercepted and controlled what the legitimate user made on his work station, will not be able to recover the missing element transmitted by the mobile phone and outside of his range.

Another technique based on the infrastructures with public keys (PKI) consists in arranging within each user's system an electronic certificate. When the user connects to the application, the control access mechanism checks the presence of said certificate on its interface and validates an authentication sequence.

Another technique consists in comparing the biometric file of the authorized user, for example his digital fingerprint, with a biometric characteristic of reference and stored, either in a smart card or in the server of the control access at the time of the enrolment of this user.

All those techniques generate a token of access, conventionally designated by "token" in the Anglo-Saxon literature, which theorically allows the authentication of the legitimate user only. As this can be understood, it is critical in all these techniques that a second presentation of this token (i.e. a new "set" of token) by any person cannot lead to an illegitimate authentication and, consequently, to a fraud on the network.

Although these techniques show a well established and undeniable effectiveness, one should notice that they were designed and carried out well earlier than the development and wide spreading of the Internet which is known today. In this respect, these techniques show significant drawbacks as the society moves towards a fully dematerialized economy and the public tends to generalize the use of Internet network for all kinds of possible transactions. Thus, techniques which could appear effective and adapted to a restricted circle of users—i.e. users having a wide know-how regarding the installation of sophisticated systems and software on their machine—these same techniques nowadays show prohibitive disadvantages as there is a need for everybody to take advantage of all the possibilities offered by the Internet network.

The European patent application 04368072.7 filed on Dec. 1, 2004 by the Assignee of the present application describes a very effective process of authentication based on the collection of a wide number of elements of information available from the operating system, in particular those involved in the checking of the availability of the drivers allowing interface with the OS. Such information, when being collected, allows the generation of a unique information, characterizing the system, and allowing to distinguish it from any other systems. This information—designated as 'digital DNA" or DDNA by the Assignee of the present application allows to significantly increase the security of the authentication procedure.

Thus, the process which is described in the above mentioned patent application considerably improves the security of the identity of the users and, in no way, requires the disclosure of the elements of the personal identity of the user (name, residence, etc. . . . ). However, this process presents the disadvantage of exposing in a non appropriate way this particularly sensitive digital information which is the "digital DNA" rendering the user's machine unique.

Thus, any third party might be capable of intercepting such "digital DNA" information, and diverting it from its authorized use and proceeding to a usurpation of identity, which one absolutely wishes to avoid.

To avoid such situation, it is advisable to have a specific technique, perfectly adapted to the protection of DDNA information particularly during its transmission through the internet network.

Such is the problem to be solved by the object of the present patent application.

SUMMARY

It is an object of the present invention to provide a reinforced authentication process being able, when necessary, to replace the traditional identifier-password (login-password)

while giving the user the possibility of defining himself the token used for its authentication.

It is another object of the present invention to ensure the protection of the token user being used during the various authentication procedures.

It is a third object of the present invention to control the access to a digital application during the execution on a distant server managed by an applications supplier from a system of information treatment exploited by an authorized user.

It is a fourth object of the present invention to protect the digital identity necessary to access to a digital application, in order to prevent the stealing of identity and the usurpation of the identity of the authorized user.

It is a fifth object of the present invention to allow the use of a digital identity in order to control the access of an IHS information system (Information Handling System) to a digital application of such kind that if the digital identity is proved intercepted, it cannot be used to access the protected application.

It is a sixth object of the present invention to achieve a strong authentication process which does not require any complex installation of software on the generic machines allowing access to the public to the internet network and to the web sites which compose it.

It is a seventh object of the present invention to provide such strong authentication process without requiring the transmission by the user on the network of private sensitive information.

It is an eighth goal of the present invention to provide a process of strong authentication not requiring the user to memorize a password.

It is finally a ninth object of the present invention to provide a process of strong authentication which is completely transparent for the user who will be able to proceed to his inscription and his authentication on a web site in a completely automatic way.

The invention achieves these goals by means of a reinforced authentication process based on the collection of data representative of hardware components contained in a system (I.H.S), said process comprising a step of enrolment and a step of authentication comprising the steps:
    connection to a web site and reception of a web page comprising an executable code;
    detection and collection of a list of hardware components starting from the information collected by the operating system, in particular for the loading of the pilots;
Wherein the enrolment process further comprises the following steps:
    displaying a list of hardware components resulting from said collection and selection of a subset of said list in order to constitute a digital information of reference (DDNA) of the user's system;
    generation of a digital information of reference (DDNA) from said subset, said digital information of reference resulting from a hash operation applied to the raw data composing the collected data;
    use of said digital information of reference (DDNA) with a received seed of an authentication server in order to generate a One Time Password.

In a particular embodiment, the seed generated by the authentication site comes from a quantum generator integrated into said authentication site.

In a specific embodiment, the OTP is further generated starting from the PIN code of the user, is concatenated with said DDNA digital information of reference, and the random factor.

Preferably, the OTP is further generated starting from a digital information of reference relating to the authentication server, which is concatenated with the PIN code and with said DDNA digital information of reference of the user's system, and the random factor.

It will also be possible to concatenate, with basic information being used to generate the OTP, a timestamp allowing the insertion of time element information within the said OTP.

Thus the invention allows to advantageously use one or more hardware identifiers selected by the user, in order to provide a user token allowing a reinforced authentication, and to protect such token within an authentication procedure comprising a double challenge-response.

DESCRIPTION OF THE DRAWINGS

Other features, objects and advantages of the invention will be understood with the reading of the description and the drawings hereafter, only given as non limiting examples. On the annexed drawings.

DESCRIPTION OF THE PREFERRED EMBODIMENT

The investigations carried out by the Applicant revealed that the DDNA information (digital DNA) significantly improves strong authentication between a service provider and an user, connected by a LAN, a WAN or Internet, through a computer or a smartphone (Symbian®, iPhone®, Android®, Windows Mobile®). In a first step of enrolment, the user decides which hardware component will be used by him as a ken, which he will authenticate in a unique manner thereafter.

Indeed, as it will be seen in the first embodiment described hereafter, this DDNA digital information authorizes the user to proceed himself to the definition of the token which will be used by him as authentication.

I. First Embodiment of a Process of Enrolment and Authentication

Figure 1:
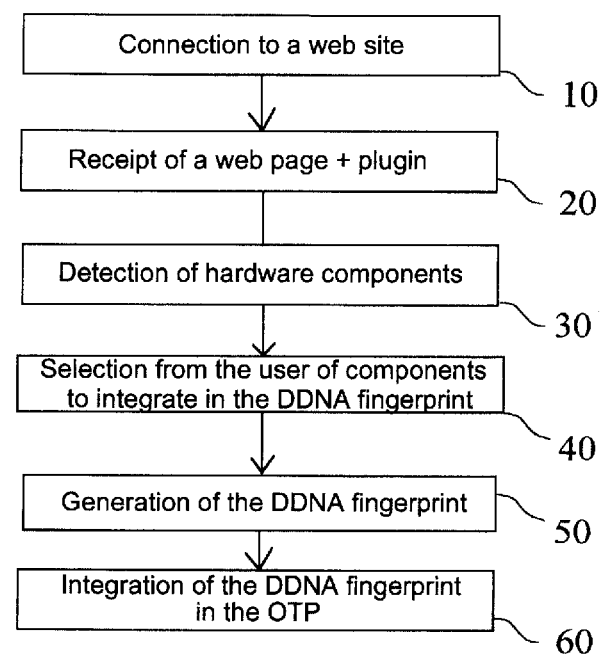
FIG. 1 illustrates the principle of an embodiment authorizing the user to define itself the authentication token integrating one or more hardware elements for the generation of DDNA digital information.

Now it is described, according to FIG. 1, a first embodiment of an authentication process allowing either to replace the conventional method of the identifier/password (login-pw), or to come to supplement this method to significantly reinforce the user's authentication by means of a token (token) directly chosen by the user.

The process which will be hereinafter described implements three entities, namely a client software executed within the user's system, a web site which is accessible through the Internet or an intranet network, and an authentication server operating as a trusted third party, the three elements 100, 200 and 300 being able to communicate through secure channels such as CHAP (Challenge Hardware Authentication Protocol), HTTPs, well-known to person skilled in the art and for which further development is neither necessary nor convenient.

The process comprises a phase of enrolment, which then will be followed by to a phase of authentication.

1. Enrolment

One assumes that the user wishes to be connected on an Internet site through the internet network and consequently launches his software browser being installed in his system.

The process consequently starts by a step 10 which is a connection transmitted to the web site.

In a step 20, the web site responds, for example by means of a 200 type response as defined in the RFC2616 defining the well-known Hypertext Transfer Protocol, by means of a web page comprising for example a plug-in or Java applet, namely an executable code allowing the execution of the different steps which shall be described below. The executable code starts by inviting the user to type his/her identifier of connection (login) and his/her password (password).

In practice, the response issued on step 20 by the web site will be able to conform to a large variety of distinct situations and protocols. Indeed, in addition to the well-known page "200" of the HTTP protocol, one will be able to consider all the possibilities allowing the opening of an authentication page, in particular CHAP, MSCHAP (the version published by the American Microsoft Corp.), but also the versions BASIC and CHALLENGE RESPONSE, and also RADIUS (Remote Access Dial-in Using Service) well-known to a person skilled in the art. In a particular embodiment, which is that chosen by the Applicant of the present patent application, a software kit is proposed to the editors of the web site for the implementation of the processes described in the present request.

In the step 20, one many particularly consider the transmission by the web server of a list of classes corresponding to a list of types of hardwares and eligible components for the calculation of DDNA fingerprints of the system of the user. This list can comprise the type of processor, the motherboard, types of USB peripherals, see peripherals communicating (such a SMARTPHONE or Portable Document Assistant (PDA) etc. . . . .

The execution of the applet contained in the received response of the web site provokes then, in a step 30, a data collection, namely the starting of a process of detection of the hardware components of the system in order to gather data representative of said components through the drivers available through the Operating System (OS).

Generally, one may consider the existing developments in the European patent application 04368072.7 (counterpart U.S. Pat. No. 7,877,614) cited above, which gives illustrative examples of components that can be used. As that is described in this patent application, a great number of information concerning the different hardware components are transferred to the operating system, that is about WINDOWS under its various versions (XP, VISTA, WINDOWS 7 . . . ) or LINUX etc, in particular in order to allow the loading of the drivers necessary to the interfacing of the operating system with these components. The contribution of the above cited request, consists in gathering this significant information, initially intended for the "internal" operation of the component, in order to constitute a unique digital information (DDNA) that can be used to the implementation of a reinforced operation of authentication.

Thus, in the case of a conventional USB key, one raises up to 16 characteristics (the manufacturer brand, the model, the serial number, the memory size . . . etc. . . . ) are accessible to the operating system and can be potentially used for the generation of the digital information indicated by the name of DDNA.

In a particular embodiment, the discovery of components is achieved in accordance with a list of classes of classes defined by the authentication site and transferred from this during step 20.

Once the discovery operation is completed, the process proposes to the user, during a step 40, the selection of a subset of the components identified during step 30 in order to collect the data accessible to the operating system and representative of the subset of components selected by the user. In one particular embodiment, the selection of the user is a default option, and the absence of selection by the latter then leads to the generation of a user token integrating a predetermined set of hardware components being present in the system, in particular such as defined by the system administrator.

As it can be seen, the user thus selects, during step 40, a hardware element being for instance his/her computer of a memory storage connected to the latter (a USB key, a MP3 reader . . . ) or even a Smartphone. The selected hardware component will serve for extracting the information element which shall be used for a subsequent generation of the DDNA information (the digital DNA®). The user can combine different hardware components, for instance his own computer and a USB key. When appropriate, he/she will be able to complete the security process by a PIN code in order to avoid the abusive use of his hardware in the event of loss or theft.

In a step 50, the process then performs a data processing for the purpose of concatenating the collected raw data during the preceding step in order to generate a digital information which is representative of the hardware components present in the system. This concatenated raw data are then the object of a hash operation in order to generate digital information of reference: so-designated: "the digital DNA" or DDNA. Thus, this DDNA information results from the transformation, by means of a hash processing executed on the string of characters concatenating the different information extracted by the OS of the hardware components. In this respect, one will be able to consider the MD4 or MD5 algorithms of Mr. Ronald Rivest, or the more recent SHA algorithms developed by NIST.

In a particular embodiment, one achieves a particular fingerprint of this DDNA information by means of the following operation:

PKCS_PBKDF2_HMAC<SHA256>(sha256(pin code user)+hash(DDNA)+magic number+seed).

The result of this operation will be later indicated, under the term "DDNA fingerprint". But this is only one illustrative, non limiting, example and any other operation could be certainly considered by a skilled man. More particularly, one could even indicate the string of concatenated characters under the name DDNA and indicate under the term "DDNA fingerprint" the result of a hash on this characters string.

Multiple alternatives can be considered. Most important being that the DDNA fingerprint which is likely to be transmitted on the network (in a particular embodiment) is the result of at least one hash operation to ensure the protection of the original information composed of the string of characters of the hardware components of the I.H.S. system of the user.

Indeed, the use of the HASH process here guarantees that the raw data which are used for generating the DDNA information will never be revealed. The system can achieve an analysis of the quality of the raw data in order to determine whether they can be properly used, as certain digital components might not be sufficiently unique.

Because one can not reconstruct the raw data from the sole DDNA fingerprint, the latter will be transmitted to the authentication server for an adequate storage and will server for testing purposes.

Alternatively, as one will see now, it will even be possible to avoid the transmission of the DDNA digital information of reference, in order to further increase the security of the authentication process.

For this purpose, the process advantageously proceeds with a step 60 which consists of the insertion of the DDNA digital information into a generated One Time Password (OTP), such as defined in the RFC 2289 standard. To achieve this, the DDNA information—or alternatively the fingerprint—is concatenated with a seed provided by the authentication server and the whole is then subject of a serie of hash operations for the purpose of generating the OTP.

In one particular embodiment, one combines the DDNA digital information of reference with a seed generated by a quantum generator so as to considerably strengthen the security of the authentication process.

In another embodiment, one also integrates in the OTP, at the same time as the quantum random factor, the user PIN code, a time stamp as well as the digital information of reference corresponding to the authentication server. This achieves a great robustness of the OTP mechanism and thus, of the protection of the DDNA information.

It can be seen that the process which was described in reference to FIG. 1 shows a significant advantage which was not provided by the known techniques, i.e. the advantage of generating a user token since it is the user who can selects the particular component(s) which will be used for generating the DDNA information, which can even never be transmitted through the network.

In addition, one will note that a possibility is given to the user for recording several "DDNA fingerprints" so as to enable him to create several different enrolment and authentication procedures, each one being linked, for example, to one different hardware component (USB key, mobile etc. . . . ).

There is here a significant advantage of the proposed solution. It is the user who keeps the control of the definition of the hardware element which he/she owns and which shall serve for composing the DDNA information and, consequently, will be used for the authentication procedure over the Internet web site. Thus, authentication does not result from any specific hardware component provided by the Web site, but on the contrary any hardware component owned by the user.

The process which was described above further shows a significant advantage in comparison to other techniques of strong authentication, in particular based on biometrics. Indeed, the users are always reticent with the idea to see personal biometrics data be transmitted through a network and such concern is absolutely legitimate. The solution which is here proposed allows a comparable level of security (because of the great diversity of the hardware components and specific information loaded to the operating system, (for example 16 parameters in the case of a USB key, up to 43 parameters in the case of a computer), while preserving the user of a disclosure of his biometric data, therefore making it possible to know or usurp his identity.

The technique suggested in the present patent application, because it substitutes the biometric data with a much less personal information—the digital DNA—still allows a very powerful authentication process. And which can be easily reinitialized if one usurpation or abuse occurs, contrary with the biometric data which can not be changed.

The procedure of enrolment which has been described can be used for a strong authentication procedure, allowing to take advantage of the fingerprint or the diversity of DDNA fingerprints created by the user.

2. Process of Strong Authentication

The implementation of the authentication procedure of the OTP which was described above (said OTP user token to express the fact that it is the user who defines himself the hardware component being used for the authentication) requires the installation of a specific functionality, and this by means of a suitable code included into the authentication page. Which code is forwarded to the client computer, fitted with a software installed only the first time (JAVA applet, ActiveX module, plug-in browser, widget, other . . . ):

1. An original X509v3 certificate disposed on the authentication server allows to the browser of the user to verify that the identity of the server was not usurped (preventing any phishing attempt for example)

2. The user clicks on an icon—representative of the authentication by the digital DNA—which icon replaced the couple "login-password" on the page of the site. He only has to input his/her identifier and the server checks the consistence of such identifier and the digital DDNA information stored, if necessary, on the server. It must then indicate its PIN code—in an optional way according to the choice of the web site concerned—to be authenticated.

3. The digital information of reference (DDNA or Digital DNA®) is calculated, based either on the computer itself, or one several of its internal components (motherboard, processor, hard drive . . . ) or still a removable component (USB key). It is then optionally completed by the PIN code input by the user. A random generation allows to create the challenge with the server but also the ciphering of a hash result. This hash [DDNA+random+identifier+(PIN)] is then conveyed towards the authentication server through a conventional ciphered tunnel (https) such as known in any conventional OTP system. This authentication server then will directly authorize (or not) the connection to the web site, or will pass the authorization to another server (Active Directory, LDAP, or Radius). In no way, the client is required to transmit a clear password to the server accessible through https.

II. Second Embodiment of the Process of Enrolment and Authentication

Figure 2:
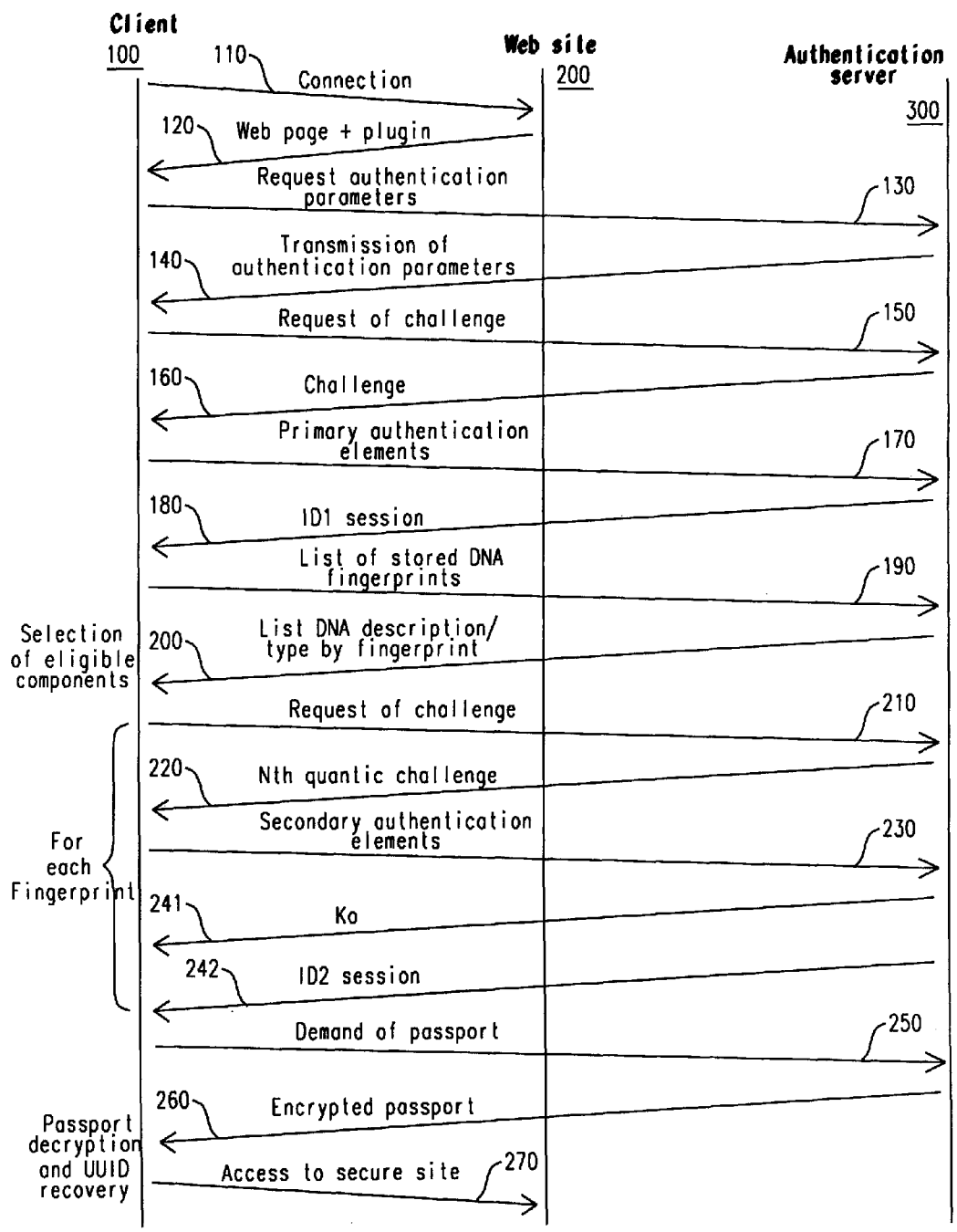
FIG. 2 illustrates the flow exchanges in a second embodiment of the invention.

One will now described, in relation to FIG. 2, a second embodiment showing more particularly one example of an enrolment and an authentication process.

It can be seen in the figure that the process implements the client software 100 located within the user computer, a web site 200 on the internet network, and an authentication server 300 acting as a Trusted Third Party, the three elements 100, 200 and 300 being capable of communicating through secured HTTPs type channels well-known to a skilled man.

In a step 110, the process consequently starts by a connection transmitted to the web site.

In a step 120, if the particular case where the client application to be used for the execution of the processes described hereinafter is not already installed on the client station, then the web site responds by means of a web page comprising a plugin or java applet for the implementation of the procedures and methods described hereafter, and which particularly starts by inviting the user to input an identifier (login) together with a password.

The execution of the client application or the applet included within the response received from the web site then causes, in an optional step 130, a connection to the authentication server in order to request the authentication parameters, which will be used for the generation of the OTP password. Generally speaking, the authentication parameters provide the list of component classes which are eligible for allowing a connection to the considered web server: CPU, motherboard, USB peripheral, Smartphone, etc. The list of the eligible classes is defined by the server administrator. The list is a coded string of base 64.

Then, in a step 140, being also optional, the authentication server sends an information which is representative of a list of the types of hardware components and eligible components for the generation of the DDNA representative of the user system. This list can comprise the type of the processor, the motherboard, the types of USB peripherals, see communicating peripherals (such as a Smartphone or a Portable Document Assistant (PDA) etc. . . .

In a step 150, the applet transmits a message requesting from the authentication server 300 a challenge, in accordance with the specification of the RFC 2289 standard.

In one illustrative—non limiting—example, the request message of the challenge, which is transmitted in step 150, comprises a certain number of parameters, which are:

As example by no means restrictive, one will be able to adopt a challenge and an authentication sequence such as defined below:

```
DDNA User has the fields :
    - login = user login
    - mobUid = mobUid returned byt he server
    - authKey = generated strongkey ( also called authKey)
    - userSettings :
    - email
    - password = SHA256 (user pin code)
    refKeystore has the fields :
    - cipherData = refKeystoreData;
    - type = 0;
    keystore has the fields :
    - cipherData = keystoreData;
    - dnaMetaData =
        - challengeKey     = dnaChallengeKey
        - migrationKey     = dnaMigrationKey
        - description      = dna.description
        - type             = dna.type
        - deviceList =
            - description
            - deviceClass
    - type = STRONG
    Initialisation
    openApi( )
    list<Device>
    listConnectedDevices( )
    policy
    getParameter(accountid, type)
    registerUser( login, userSettings(email,pin code>),
dna( descirption, type,list<Devices>, Uid ))
    generateMobUid( )
    mobUid
    addDnaUserKeystore(accountid, dnaUser, refKeystore, keystore)
    Generate passport
    generate "refKeystoreData"
    generate "keystoreData"
    generate "dnaChallengeKey" et "dnaMigrationKey"
    Select Devices
    - dnaChallengeKey = PKCS_PBKDF2_HMAC<SHA512>
    ( SHA256 (pin code user) + qki_hash(selected devices) +
    magic_number , SALT2 )
    - dnaMigrationKey = qki_hash(selected devices)
    - mobUid             = the mobUid returned by the server
    - strongKey(authKey) = SHA256 ( random, sel )
    - privKey            = SHA256 ( random, sel )
    - ref_key = PKCS5_PBKDF2_HMAC<SHA512> ( SHA256
    ( user pin code) +magic_number, SALT1 )
    - refKeystoreData= Crypt_AES ( passport, refKey)
    - key = PKCS5_PBKDF2_HMAC<SHA512> ( SHA256 ( user
    pin code) + qki_hash(selected devices) + magic_number,
    SALT2)
    - keystoreData= Crypt_AES ( passport, key)
register user with DDNA
```

In a step 160, the authentication server consequently generates a first challenge, which is an object returned by the server having, inter alia, a "challenge" string type field. In a particular embodiment, the contents of the challenge is generated by integrating a random factor generated by a quantum card integrated into the authentication server.

Preferably, the challenge is presented in a way defined in the RFC "ONE TIME PASSWORD":

otp-<identifier of the algorithm><sequence number><seed> such as for example otp-md5 487 dog2 coming to specify the use of the MD5hash algorithm, a number of sequence 487 and one seed equal to "dog2".

In a particular embodiment, the inventor discovered that it was possible to surprisingly reinforce the robustness of the algorithm while opting for a seed generated by means of a quantum generator ensuring a perfect random factor. Such a quantum generator functions on the principle of a choice of a photon likely to cross or not a semi-reflective blade.

After the reception of the first challenge, the client application or the generated applet, during a step 170, the detailed response corresponding to this first challenge. For the detail of the response to be transmitted to the server, according to the received challenge, one will be able to be inspired for example from the CHAP (Challenge Hardware Authentication system) protocols well-known to a person skilled in the art. Generally, it will be observed that the process which is described is adapted to the use of a great number of alternatives of challenge/response which are within the range of a person skilled in the art and which will not be further developed.

Then the process proceeds to the generation of a primary authentication information including:
the LOGIN of the user;
a hash of the PIN code of the user (e.g the sha256 of the open source library cryptopp);
the respond to the first challenge.

This information of primary authentication is then transmitted to the authentication server according to a HTTPs protected channel, for example.

In a step 180, the authentication server 300, which database includes the identification information (login, PIN) checks the primary authentication information and transmits its response, negative or positive. When the response is positive, the server transmits a first identifier of session sessionID1, which proves the existence of a user in the base and starts the real authentication transaction between the client and the server.

From this moment, the client application or the applet communicates with the authentication server 300 by means of the session identifier sessionID1 and no longer by means of a conventional login identification, which could have been abused. As it can be seen, one thus significantly improves the security of the authentication process.

Indeed, in a step 190, the client application or the applet transmits a request message to the authentication server 300 by using the information of Session ID1. It then requests to receive an information representative of the number of DDNA fingerprints and, for every fingerprint, the corresponding list of the classes of hardware components (processors, peripherals, USB key etc. . .). It should be noted, and this is important for a clear understanding of the level of security achieved by the process, that DDNA fingerprints are in no way transmitted during this step 190 . . . . Only a "list" indicating the identifiers of the fingerprints and the definition of the classes corresponding to each element of the "list" is actually transmitted over the network.

In a step 200, the authentication server responds and transmits this "list" specifying the number of DDNA fingerprints and for each one of them, the definition of the classes being used.

Further to the receipt of such description list, the process carried out by the applet enters in a loop, illustrated in FIG. 2 by the steps 210-241 or 210-242, which loop will try a secondary authentication by means of a sequential treatment of each element of the list of fingerprints received during step 200.

Indeed, for each fingerprint listed in the list of step 200, the applet transmits, in a step 210 a message requesting a new challenge, to which the server responds, during a step 220 by a new challenge, integrating a seed (Nth challenge), based on the previously mentioned quantum generator.

Then, during a step 230, the client application or the applet calculates the DDNA information corresponding to the classes associated with the considered fingerprint (and defined on the list of the step 200), and prepares a response to the challenge of step 220.

The step 230 is completed with the transmission to the authentication server of the elements of secondary authentication, which particularly comprise the following information:

- the identifier of connection SessionID2 (allowing to find the login of the user in the base of the authentication server)
- the hash of the PIN code (if this option were selected)
- the result of the calculation of the DDNA fingerprint for the considered element of the list of step 200
- the response presumed valid or invalid to the Nth quantum challenge (a challenge by hardware found in the list of DDNA fingerprints for the considered user).

Then, the authentication server of the authentication elements sends its negative response (arrow 241) or positive (arrow 242), comprising a secondary identifier of session sessionID2.

In the case of a negative response, the client application tries a secondary authentication based on the following element of the list of the step 200 until exhausting all the elements of this list and, in this case, refuses the application of authentication.

On the contrary, when the secondary authentication is succeeded, the process continues with a step 250 during which the applet solicits by using the sessionID2 a "passport" for the benefit of the user.

In a step 260, the authentication server 300 responds with an encrypted "passport".

In a particular embodiment, the passport is created, encoded and stored during the enrolment of the user (by integrating or not the DDNA information), in the following way:

The software client concatenate in a string:
- a UUID requested to the server
- a strongKey created by generating a random string hashed in SHA256 with a seed
- a privateKey (reserved for a later use)

This passport is then encoded by the software client in AES by using as an encoding key (strongkey):
PKCS_PBKDF2_HMAC<SHA256>(sha256(pin codes to use)+hash(DDNA)+magic number+seed)

The passport is stored on the authentication server for the subsequent authentications of the user through his strongkey.

The passport is temporarily stored during the authorized time of the session (fixed by the administrator of the system) on the authentication server, valid for all the authentications of the user on the considered web site. The system can also pass this authentication authorization in an optional manner to the other systems such as RADIUS or ACTIVE DIRECTORY.

Then, in a step 270, the applet deciphers the passport in order to recover the strongkey of the user. It is used to make the PIN code of the user and the DDNA of the authentication server. The client can then access in a secure manner the web site by means of the strongkey.

III. Advantages of the Invention

The authentication process presents two major advantages: the user does not have access and thus does not know the Digital DNA because this latter is generated only the challenge—which is a hash—is sent.

The digital DNA is based on standard security diagrams (https, Challenge Handshake Authentication Protocol (CHAP), SHA, AES . . .). The generation of the challenges is based on a quantum random factor which responds to the most strict good practices of security.

The secrecy shared between client and server is summarized with a relative information with certain hardware components of the client and is hidden in these hardwares, coupled to a challenge of OTP type. This digital information of reference is indicated by the name: "DDNA". (digital DNA®)

The protection of this information is assured in the following manner:

Protected importation of the parameters of enrolment and authentication: the hardware characteristics of the client station which the application will collect (either whole or part of the components of the station and/or one or more removable peripherals) are imported from the server through a protected protocol (SSL coding).

Protected transfer of the data of enrolment and authentication towards the server: the hardware data chosen by the user to be enrolled is collected by the application then transmitted towards the server through a protected protocol (https). This protocol is based on an exchange of the initiated key by the server at the beginning of the session and by a AES coding of the data before transmission. There is also an addition of seed "a seed" and of the timestamp to ensure the security and the validity of the messages.

Protection of the modified data: all the sensitive modified data (AES keys, hardware data, parameters) are deleted from the memories of the host PC at the end of the session.

Integration of a double challenge-response to prohibit any new attempt: the protocol of data exchanges between the server and the client integrates a protection prevent multiple resubmission of authentication frames, based on the exchange of challenges and on a temporal window to respect in order to achieve the exchange.

The encoding algorithm being used is the AES 256 in CBC mode. For the challenge/response, the algorithm used is the HMAC-SHA256.

Encapsulation of the PKCS#11 envelope in the X9.84 envelope containing the Digital DNA: to be in conformity with the interoperability of the existing authentication solutions, the system optionally disposes two libraries for the management of PIN/PUK codes:

Library PKCS#11 allowing to the not Microsoft applications a standardized communication with the PIN orders of the DNA.

In this management, one particularly finds the PIN lifespan, the number of PIN tries, the activation/deactivation of PUK code.

All the security regulations of the PKCS#11 are incorporated in the library of the digital DNA®.

Library CSP: allowing for the Microsoft applications (IE, Outlook, Windows) an interoperability with the Digital DNA related to a 2nd factor which is the PIN code.

It should be noted that the communication between the DLL PKCS#11, CSP and the Digital DNA is signed by a certificate which can be signed by the AC of the client just like the set of DLL and Services of the Digital DNA®.

Applet signed (personalized by PIN code) numerically by a X509v3 certificate which helps to detect the attempts of phishing.

Locking of the code: The executable code of the Digital DNA® is protected by obfuscation against dismantling. Security measures are also implemented in order to reinforce security during the exploitation (closing of the session forced after a period of inactivity or of an error for example). Lastly, the assemblies (DLL and executables) are signed.

In the same way, the supplier of the application can identify a backup authentication mechanism, in order to allow to a user who lost his IHS used for the authentication access of the protected application. It is the supplier's responsibility to ensure that this backup mechanism presents an acceptable compromise between the level of risk and the frustration of the users. The recommended approach consists in having each user authorized to register several IHS.

In a preferred embodiment, the invention is in conformity with the IEEE-802 standard of services and the family of the protocols of standard relating to the local area networks (LAN) and the metropolitan area networks (MAN).

The invention can find applications in logical situations of control access, in particular, but not necessarily when the ANSI X9.84 security standard must be respected. It can also be used to recognize a user each time that returns to a web site, as do the "cookies" which are often used in such environments.

The logical access control refers to the practice of the limitation of the access to the logical resources, such as the digital applications or the digital data.

The logical access control is mainly found in the company environments, to control the access to a private network in the locals of a company (for example through a local network) or to access the data from the outside of the company towards the locals of the company (for example through a virtual private network). More and more often, logical access control is necessary according to the web environments, either to access to sensitive data (health, banking services, etc) or to confirm transactions for example of electronic commerce, the financial transactions, of management of web content, the social networks, etc.

The invention is well adapted to bring a sufficient guarantee to all these operations.

In many situations, where the digital identity theft is concerned, but the true identity of the user is not important, a simple on line inscription procedure coupled with the digital DNA can be enough.

In the situations where an unlimited access to a service is related to the payment of a subscription, the invention is much more effective than a password in order to limit the fraud resulting from the sharing of the password with other unauthorized users.

Another use of the invention lies in the access to the site without requesting the user his identifier, and where the paramount question is not the need for precisely recognizing a user among all the authorized users. The invention provides the same degree of confidence, without having to disturb the user by requesting him to enter its identifier.

Another use lies in the need for the providers of many applications to be conscious of knowing if the visitor is new or old. The invention is more effective than the cookies, because the Digital DNA of the IHS user cannot be hidden, whereas the cookies can.

The fields of the application of the invention are most varied on Internet: on line banking services, the e-commerce, e-government, web based subscriptions (magazines, music, video), e-gaming, the social networks, are only some examples of fields where the invention can be used with profit.

The invention claimed is:

1. A method of authentication based on the data collection representative of hardware components contained in a user system, for a data processing system (I.H.S.) of a user, said user system communicating with a web site and an authentication server, said method comprising the following steps:
   requesting connection by said user system to said web site via a software browser;
   receiving by said user system of a web page and an executable code via said software browser in response to said connection;
   requesting connection by said user system via said software browser to said authentication server in order to request the authentication parameters serving for the generation of a one-time password (OTP);
   transmitting from said authentication server of information representative of a list of the types of eligible hardware components for the calculation of digital information of reference, digital DNA (DDNA) to said user system;
   requesting by said user system a challenge from said authentication server;
   generating to said user system from said authentication server a first challenge;
   transmitting by said user system authentication information to said authentication server, said information comprises:
     a LOGIN of the user;
     a hash of a PIN code of the user;
     an identifier of the first received challenge;
   checking by said authentication server of said authentication information transmitted by said user system;
   in the event of success of said verification, requesting by said user system of the description and the DDNA stored on said authentication server, said DDNA being associated with hardwares to be present in the user system;
   transmitting to said user system by said authentication server of the description and the type of DDNA stored on said server;
   determining by said user system, a list of hardwares to be tested on said user system;
   for each hardware component corresponding to said list, achieve the following steps;
     transmission of a request for challenge to said authentication server;
     reception of a challenge of said authentication server;
     transmission of a response including:
       an identifier of connection (login) associated to the connection to the web site;
       a fingerprint based on said DDNA of a tested hardware component;
       a hash;
   checking authentication elements by the authentication server and transmission of a response to said user system comprising an identifier of session (sessionID2);
   transmitting by the user system of a request for passport associated to said sessionID2;
   transmitting by said authentication server of the passport in an encrypted form;
   decoding by said user system of said passport and access to said web site.

2. A non-transitory computer-readable medium having computer-executable instructions for performing a method of authentication based on the data collection representative of hardware components contained in a user system, for a data processing system (I.H.S.) of a user, said user system communicating with a web site and an authentication server, executing said method comprising the following steps:

requesting connection by said user system to said web site via a software browser;

receiving by said user system of a web page and an executable code via said software browser in response to said connection;

requesting connection by said user system via the software browser to said authentication server in order to request the authentication parameters serving for the generation of a one-time password (OTP);

transmitting from said authentication server of information representative of a list of the types of eligible hardware components for the calculation of digital information of reference digital DNA (DDNA) to said user system;

requesting by said user system a challenge from said authentication server;

generating to said user system from said authentication server a first challenge;

transmitting by said user system, authentication information to said authentication server, said information comprises:
 a LOGIN of the user;
 a hash of a PIN code of the user;
 an identifier of the first received challenge;

checking by said authentication server of said authentication information transmitted by said user system;

in the event of success of said verification, requesting by said user system of the description and DDNA stored on said authentication server, said DDNA being associated with hardwares to be present in the user system;

transmitting to said user system by said authentication server of the description and the type of DDNA stored on said server;

determining by said user system, a list of hardwares to be tested on said user system;

for each hardware component corresponding to said list, achieve the following steps ;
 transmission of a request for challenge to said authentication server;
 reception of a challenge of said authentication server;
 transmission of a response including:
  an identifier of connection (login) associated to the connection to the web site;
  a fingerprint based on said DDNA of a tested hardware component;
  a hash;

checking authentication elements by the authentication server and transmission of a response to said user system comprising an identifier of session (sessionID2);

transmitting by the user system of a request for passport associated to said sessionID2;

transmitting by said authentication server of the passport in an encrypted form;

decoding by said user system of said passport and access to said web site.

\* \* \* \* \*